(12) United States Patent
Washam et al.

(10) Patent No.: US 11,410,111 B1
(45) Date of Patent: Aug. 9, 2022

(54) GENERATING PREDICTED VALUES BASED ON DATA ANALYSIS USING MACHINE LEARNING

(71) Applicant: Wells Fargo Bank, N.A., San Francisco, CA (US)

(72) Inventors: Zachary Washam, Charlotte, NC (US); Carmel Nadav, Eagan, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 15 days.

(21) Appl. No.: 16/058,569

(22) Filed: Aug. 8, 2018

(51) Int. Cl.
  *G06Q 10/06* (2012.01)
  *G06F 9/451* (2018.01)
  *G06N 20/00* (2019.01)

(52) U.S. Cl.
  CPC ........... *G06Q 10/067* (2013.01); *G06F 9/451* (2018.02); *G06N 20/00* (2019.01)

(58) Field of Classification Search
  CPC ........... G06Q 10/0639; G06Q 10/0185; G06Q 30/0243; G06Q 30/0244; G06Q 30/0251; G06Q 30/0269; G06Q 30/0276; G06Q 30/0282; G06Q 10/067; G06F 9/451; G06N 20/00
  USPC ......................................................... 705/35
  See application file for complete search history.

(56) References Cited

U.S. PATENT DOCUMENTS

| | | | |
|---|---|---|---|
| 8,190,504 B1 * | 5/2012 | Stolz ...................... | G06Q 40/06 705/36 R |
| 2009/0210327 A1 * | 8/2009 | Meidan .................. | G06Q 40/12 705/30 |
| 2012/0047099 A1 * | 2/2012 | Chang .................... | G06N 3/049 706/21 |

(Continued)

FOREIGN PATENT DOCUMENTS

| | | |
|---|---|---|
| WO | 2001006431 A1 | 1/2001 |
| WO | 2015049515 A1 | 4/2015 |
| WO | 2016012647 A1 | 1/2016 |

OTHER PUBLICATIONS

Chinta et al., "Short Term Price Prediction in Financial Markets," accessed from http://cs229.stanford.edu/proj2015/033_report.pdf, Sep. 22, 2017, 5 pp.

(Continued)

*Primary Examiner* — Slade E Smith
(74) *Attorney, Agent, or Firm* — Shumaker & Sieffert, P.A.

(57) ABSTRACT

This disclosure describes techniques that include predicting a business metric associated with a given business enterprise using machine learning algorithms that have been trained on data, from other businesses, about that same business metric. In one example, this disclosure describes a method that includes selecting, from a data set, a training data subset and a test data subset; generating a plurality of candidate models configured to generate a predicted output metric, wherein the plurality of candidate models is generated by applying a plurality of machine learning algorithms to the training data (Continued)

subset; evaluating, using the test data subset, each of the plurality of candidate models to select a chosen model; receiving production data that includes data representing input metrics for a business entity not included within the plurality of business entities; and generating a predicted output metric for the business entity.

14 Claims, 8 Drawing Sheets

(56) References Cited

U.S. PATENT DOCUMENTS

| | | | |
|---|---|---|---|
| 2012/0116850 A1* | 5/2012 | Abe | G06Q 10/067 705/7.38 |
| 2013/0117199 A1* | 5/2013 | Arnott | G06Q 40/06 705/36 R |
| 2014/0046872 A1* | 2/2014 | Arnott | G06Q 40/06 705/36 R |
| 2014/0236664 A1* | 8/2014 | Zenger | G06F 16/24535 705/7.27 |
| 2014/0297489 A1* | 10/2014 | Montgomery | G06Q 40/06 705/30 |
| 2015/0015883 A1* | 1/2015 | Bringoltz | G03F 7/70258 356/399 |
| 2015/0088594 A1* | 3/2015 | Hurst | G06Q 10/0635 705/7.28 |
| 2015/0134410 A1* | 5/2015 | Bendel | G06Q 30/0201 705/7.31 |
| 2015/0134694 A1* | 5/2015 | Burke | G06Q 10/06398 707/769 |
| 2015/0206074 A1* | 7/2015 | Miller | G06F 16/212 707/792 |
| 2015/0213389 A1* | 7/2015 | Modarresi | G06Q 10/06393 705/7.39 |
| 2015/0324714 A1* | 11/2015 | Shao | G06Q 10/0633 705/7.27 |
| 2015/0379427 A1* | 12/2015 | Dirac | G06N 20/00 706/12 |
| 2015/0379429 A1* | 12/2015 | Lee | G06N 20/00 706/11 |
| 2015/0379430 A1* | 12/2015 | Dirac | G06N 20/00 706/12 |
| 2016/0055426 A1* | 2/2016 | Aminzadeh | G06N 20/00 706/12 |
| 2016/0151704 A1* | 6/2016 | Wu | G06Q 50/01 463/31 |
| 2016/0290796 A1* | 10/2016 | Levy | G03F 7/70616 |
| 2016/0313658 A1* | 10/2016 | Marciano | G03F 9/7003 |
| 2016/0342668 A1* | 11/2016 | Haddad | G06F 16/258 |
| 2016/0371395 A1* | 12/2016 | Dumant | G06F 16/24575 |
| 2016/0379143 A1* | 12/2016 | Trubin | G06Q 10/067 703/2 |
| 2017/0116621 A1* | 4/2017 | Gerard | G06Q 30/0202 |
| 2017/0220943 A1* | 8/2017 | Duncan | G06F 8/38 |
| 2017/0262757 A1* | 9/2017 | Martin | G06N 5/022 |
| 2017/0293858 A1* | 10/2017 | Larsen | G06N 20/00 |
| 2017/0309047 A1* | 10/2017 | Demiralp | G06Q 30/0241 |
| 2018/0046926 A1* | 2/2018 | Achin | G06Q 10/04 |
| 2018/0060744 A1* | 3/2018 | Achin | G06N 5/02 |
| 2018/0174060 A1* | 6/2018 | Velez-Rojas | H04W 4/02 |
| 2018/0241764 A1* | 8/2018 | Nadolski | G06N 3/0481 |
| 2018/0285685 A1* | 10/2018 | Singh | G06F 16/9024 |
| 2018/0357559 A1* | 12/2018 | Truong | G06N 3/0454 |
| 2019/0005406 A1* | 1/2019 | Malevich | G06N 5/022 |
| 2019/0005421 A1* | 1/2019 | Hammel | H04M 3/5175 |
| 2019/0026681 A1* | 1/2019 | Polli | G09B 7/02 |
| 2019/0065990 A1* | 2/2019 | Sharma | G06N 5/04 |

OTHER PUBLICATIONS

Yeo et al., "Solvency and Lquidity in Shipping Companies," The Asian Journal of Shipping and Logistics, Elsevier, Nov. 30, 2016, 7 pp.

* cited by examiner

GENERATING PREDICTED VALUES BASED ON DATA ANALYSIS USING MACHINE LEARNING

TECHNICAL FIELD

This disclosure relates to data analysis by computing systems, and more specifically, to using machine learning techniques to predict optimal, appropriate, or projected values for business metrics.

BACKGROUND

Determining, optimizing, and/or predicting business metrics associated with a corporate enterprise can help improve the operation and/or management of the enterprise. One such business metric is corporate liquidity, which is a measure of a corporation's ability to pay short-term and long-term obligations. Typically, liquidity is considered to be based on a corporation's cash holdings, which include cash instruments and short-term liquid investments. Yet cash holdings are not the only source of liquidity, since corporations can generate cash by liquidating assets, accumulating internally generated cash flows, and raising external finance. But having sufficient cash available to execute business operations, while maintaining flexibility to undertake strategic actions (e.g., acquisitions or share repurchases), may require flexible and reliable sources of cash, such as syndicated and bilateral lines of credit. Accordingly, corporate managers' analysis of appropriate corporate liquidity may involve careful consideration of the size and/or terms of lines of credit.

SUMMARY

This disclosure describes techniques that include predicting a business metric associated with a given business enterprise using machine learning algorithms that have been trained on data, from other businesses, about that same business metric. In some examples, such techniques may involve using an optimal or preferred model, chosen from among a number of models generated by a set of machine learning algorithms, to predict a business metric such as corporate liquidity. The chosen model generates a predicted value for a metric for the business based on data from that business, where that data has a relationship with the business metric to be predicted.

For instance, a computing system may receive, from management of a business enterprise or from another source, actual data corresponding to data that has a relationship with corporate liquidity, and the computing system may generate a predicted or expected value for corporate liquidity based on that data. Corporate management and advisors may gain insights by comparing the predicted value for corporate liquidity to the actual value. For example, management may gain insights about how large of a line of credit may be optimal, at least based on practices adopted by other businesses.

In another example, the computing system may receive projected data that may be expected to result from an event affecting corporate structure or business conditions (e.g., an acquisition, a dividend change, or a global recession). Based on such data, the computing system may generate an expected value for a desired business metric (e.g., liquidity, market capitalization, cash flows, credit ratings), which may reflect an expectation for the value of the desired business metric following the event. Techniques in accordance with one or more aspects of the present disclosure may enable significantly improved projections over prior techniques, as a result of more effective and thorough processing of available data.

In one example, this disclosure describes a method comprising receiving, by a computing system, a data set that includes financial metrics for each of a plurality of business entities, wherein the financial metrics include an output metric and a plurality of input metrics for each of the plurality of business entities, and wherein the output metric is correlated with each of the plurality of input metrics; selecting, by the computing system and from the data set, a training data subset and a test data subset, wherein the training data subset includes the output metric and the plurality of input metrics for each of the business entities in an entity subset of the plurality of business entities, and wherein the test subset includes the output metric and the plurality of input metrics for each of the business entities that are not in the entity subset of the plurality of business entities; generating, by the computing system, a plurality of candidate models configured to generate a predicted output metric, wherein each of the plurality of candidate models is generated by applying each of a plurality of machine learning algorithms to the training data subset; evaluating, by the computing system and using the test data subset, each of the plurality of candidate models to select a chosen model; receiving, by the computing system, production data that includes data representing input metrics for a business entity not included within the plurality of business entities; and generating, by the computing system, a predicted output metric for the business entity not included within the plurality of business entities, wherein the predicted output metric is generated by causing the chosen model to generate the predicted output metric based on the production data.

In another example, this disclosure describes a system comprising a storage device; and processing circuitry having access to the storage device and configured to: receive a data set that includes financial metrics for each of a plurality of business entities, wherein the financial metrics include an output metric and a plurality of input metrics for each of the plurality of business entities, and wherein the output metric is correlated with each of the plurality of input metrics, select, from the data set, a training data subset and a test data subset, wherein the training data subset includes the output metric and the plurality of input metrics for each of the business entities in an entity subset of the plurality of business entities, and wherein the test subset includes the output metric and the plurality of input metrics for each of the business entities that are not in the entity subset of the plurality of business entities, generate a plurality of candidate models configured to generate a predicted output metric, wherein each of the plurality of candidate models is generated by applying each of a plurality of machine learning algorithms to the training data subset, evaluate, using the test data subset, each of the plurality of candidate models to select a chosen model, receive production data that includes data representing input metrics for a business entity not included within the plurality of business entities, and generate a predicted output metric for the business entity not included within the plurality of business entities, wherein the predicted output metric is generated by causing the chosen model to generate the predicted output metric based on the production data.

In another example, this disclosure describes a computer-readable storage medium comprises instructions that, when executed, configure processing circuitry of a computing system to receive a data set that includes financial metrics for each of a plurality of business entities, wherein the financial metrics include an output metric and a plurality of input metrics for each of the plurality of business entities, and wherein the output metric is correlated with each of the plurality of input metrics; select, from the data set, a training data subset and a test data subset, wherein the training data subset includes the output metric and the plurality of input metrics for each of the business entities in an entity subset of the plurality of business entities, and wherein the test subset includes the output metric and the plurality of input metrics for each of the business entities that are not in the entity subset of the plurality of business entities; generate a plurality of candidate models configured to generate a predicted output metric, wherein each of the plurality of candidate models is generated by applying each of a plurality of machine learning algorithms to the training data subset; evaluate, using the test data subset, each of the plurality of candidate models to select a chosen model; receive production data that includes data representing input metrics for a business entity not included within the plurality of business entities; and generate a predicted output metric for the business entity not included within the plurality of business entities, wherein the predicted output metric is generated by causing the chosen model to generate the predicted output metric based on the production data.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
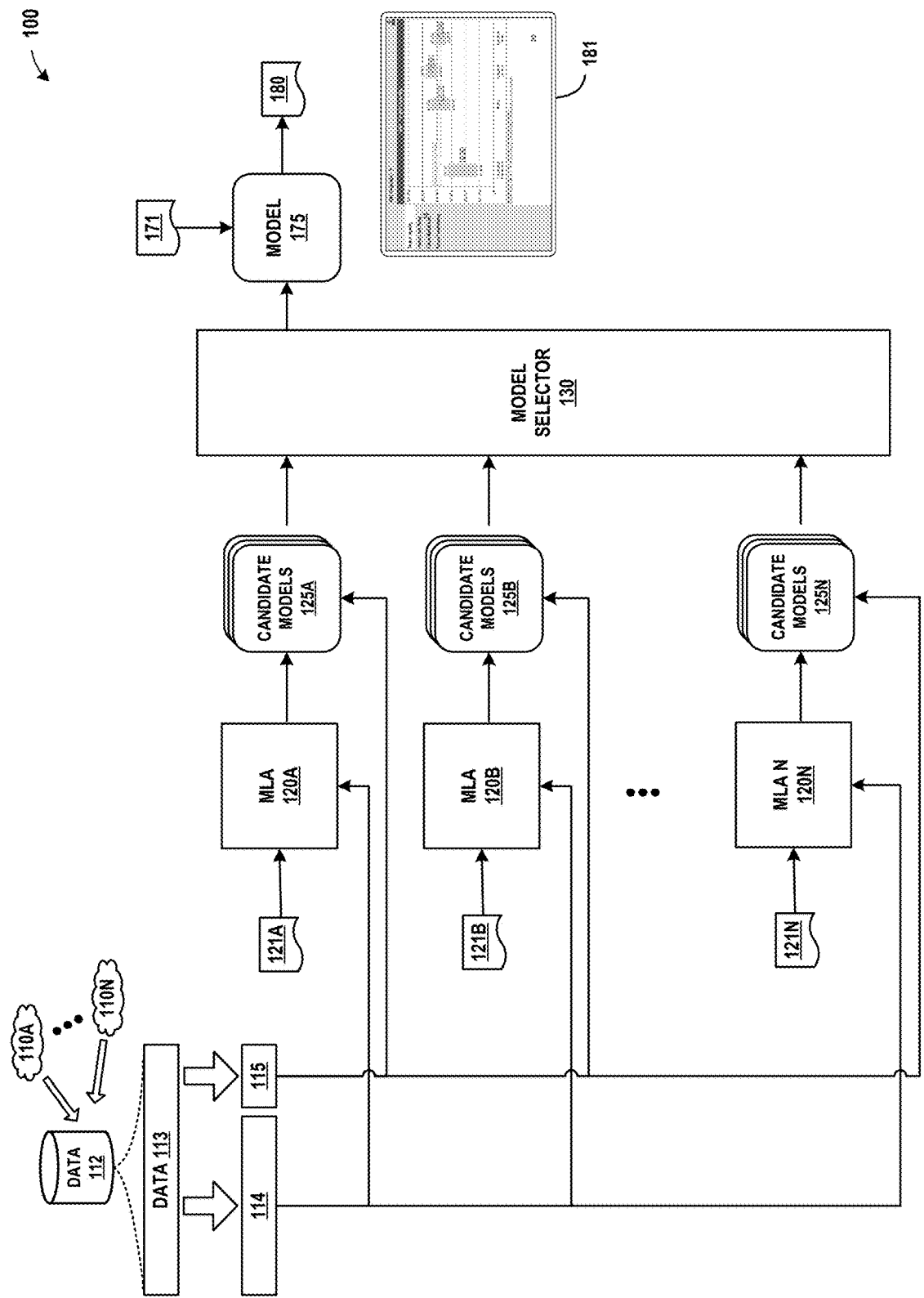
FIG. 1 is a conceptual diagram illustrating a process for generating models for predicting business metrics associated with a business, in accordance with one or more aspects of the present disclosure.

FIG. 1 is a conceptual diagram illustrating a process for generating models for predicting business metrics associated with a business, in accordance with one or more aspects of the present disclosure. System 100 includes data manager 112, which may be a database or a computational unit configured to access data sources 110A through 110N (collectively "data sources 110"). In FIG. 1, data manager 112 generates processed data 113, and from processed data 113, may produce training data 114 and test data 115. A plurality of machine learning algorithms 120 (machine learning algorithm (MLA) 120A through MLA 120N, collectively "machine learning algorithms 120") use training data 114 and test data 115 to generate and evaluate candidate models 125 (candidate model 125A through candidate model 125N, collectively "candidate models 125"). Candidate models 125 are fed into model selector 130 to identify one or more chosen models 175. Chosen model 175 may use input data 171 to generate prediction 180. Prediction 180 and other information may be presented to a user, corporate manager, or analyst through user interface 181.

Each of machine learning algorithms 120 may represent a different type of machine learning algorithm that uses various inputs metrics (i.e., financial data) that have a relationship to a desired output metric (also financial data). In some examples, each of machine learning algorithms 120 may represent machine learning algorithms and/or models that employ Ridge Regression, Lasso Regression, Gradient Descent and/or Gradient Boosting Regression, Elastic Net regularization, Random Forest learning methods, and/or other techniques. As further described herein, one of more of such algorithms may be tuned, modified, or configured with one or more hyperparameters 121 (hyperparameters 121A through hyperparameters 121N, collectively "hyperparameters 121"). In some examples, at least some of machine learning algorithms 120 are tuned with a unique set of hyperparameters (e.g., hyperparameters 121A tune MLA 120A, and hyperparameters 121N tune MLA 120N). Accordingly, with a small number of machine learning models (e.g., 5 types of models) coupled with hyperparameters used to tune the machine learning models, it may be possible to employ a larger number (e.g., on the order of 80 or 100) of machine learning model permutations.

As described herein, system 100 uses machine learning techniques to generate models for predicting financial information for one or more business metrics associated with a business entity, where such metrics may be an attribute or characteristic of corporate capital structure. For instance, a management team for a business may seek to determine an optimal value or level for corporate liquidity for the business and/or the size of a revolving line of credit used by the business. Such a management team may alternatively, or in addition, seek to determine other business metrics, such as future cash flows, market capitalization, credit ratings, or other metrics for the business based on assumptions made by the management team relating to expected business performance, future corporate initiatives, future actions affecting corporate capital structure, and/or other assumptions.

To predict such business metrics for a given business, system 100 uses data and/or information associated with other businesses or business entities to train machine learning models to generate predictions. The machine learning models are provided with data associated with the other businesses, where the data includes both the metric to be predicted (the "output"), as well as other metrics about the business (the "inputs") that have a relationship with, are correlated with, or that otherwise influence in some way the value of the output metric to be predicted. The models are trained, using supervised machine learning techniques, to identify and/or quantify the relationship between the input metrics and the output metric. After training the machine learning models, and to the extent that there is an identified relationship between the input metrics and the output metric, the models are capable of predicting the desired output metric for any given business based on input metrics from that business that are of the same type used to train the machine learning models.

Accordingly, a management team might provide, as input to the model, the business' actual current financial data (i.e., input metrics) corresponding to the type of input metrics that were used to train the machine learning model, and receive, as an output from the model, the output metric that the models were trained to predict, such as a corporate liquidity value. In such an example, the predicted liquidity value represents the liquidity value that would be expected from the business, based on the relationships between the input metrics and the output liquidity value metric that were identified during the machine learning process using the data about other businesses. If the business's current actual liquidity level is different than the predicted liquidity value, that might suggest to corporate management that its liquidity levels are inappropriate or not optimal (or at least that its liquidity levels are different than other similarly-situated businesses).

Similarly, but in a different type of example, a management team might provide, as input to one or more of the models, projected or estimated financial data (input metrics) that is based on assumptions for how the management team expects the data to change after an event affecting the business (e.g., increasing or decreasing a dividend payout, a corporate acquisition, share repurchases, strategy changes, regulatory or law changes, a local or global recession, or other event). In the case of an acquisition, for example, the projected financial data might reflect assumptions for the combined entity. In response to such input, the models may provide a predicted liquidity value that represents the expected liquidity after the event. Therefore, the management team can use the models to estimate effects of actions taken by the management team or effects of external events that might not be under the control of the management team (e.g., a recession or regulatory changes).

In the example of FIG. 1, and in accordance with one or more aspects of the present disclosure, system 100 may collect data for use by one or more machine learning algorithms. For instance, with reference to FIG. 1, data manager 112 collects data from various data sources 110 and stores the data on a storage medium within data manager 112. Such sources may be numerous and diverse, but in at least some examples, may include publicly-available data published by the Securities and Exchange Commission based on filings by public companies pursuant to regulatory requirements. Data manager 112 evaluates, processes, and/or modifies data collected from data sources 110 and generates processed data 113. System 100 selects a subset of processed data 113 as training data 114. System 100 designates the remaining data as test data 115. In some examples, training data 114 is larger than test data 115 (e.g., training data 114 may be 80% of processed data 113 and test data 115 may be 20% of processed data 113). Accordingly, training data 114 may be the processed data 113 for 80% of the businesses represented in processed data 113, and test data 115 may be the processed data 113 for 20% of the businesses represented in processed data 113. System 100 uses training data 114 as input to each of machine learning algorithms 120.

Each of machine learning algorithms 120 may generate one or more candidate models 125. For instance, still referring to FIG. 1, machine learning algorithm 120A may generate, based on training data 114, one or more candidate models 125A. Each of candidate models 125A is a model capable of predicting one or more output metrics based on input data of the type included within training data 114. Similarly, machine learning algorithm 120B may generate, based on training data 114, one or more candidate models 125B. And in general, machine learning algorithm 120N may generate, based on training data 114, one or more candidate models 125N. In some examples, each of machine learning algorithms 120 generates an optimized or best-performing candidate model 125 based on training data 114.

Further, in some examples, each of machine learning algorithms 120 may use one or more hyperparameters 121 to modify, alter, or tune aspects of how each of machine learning algorithms 120 operate or learn from training data 114 (e.g., hyperparameters 121A tune machine learning algorithm 120A, hyperparameters 121B tune machine learning algorithm 120B, and hyperparameters 121N tune machine learning algorithm 120N). Accordingly, one or more of machine learning algorithms 120 may use multiple sets of hyperparameters 121 to configure a machine learning algorithm, and each such machine learning algorithm 120 may be considered to effectively be capable of generating multiple candidate models 125, each based on a particular configuration of hyperparameters.

Model selector 130 may identify or choose one or more of candidate models 125. For instance, system 100 of FIG. 1 uses test data 115 as input to each of candidate models 125. Each of candidate models 125A through 125N generate, based on test data 115, a predicted output. Since test data 115 was not included in training data 114 (where training data 114 is the data used to train each of candidate models 125), test data 115 can be used to determine the accuracy of the predictions made by each of candidate models 125. Model selector 130 evaluates the predictions generated by competing candidate models 125 and identifies one or more chosen models 175. Typically, chosen model 175 includes the one or more candidate models 125 that best predicted the desired output metric (e.g., corporate liquidity) based on test data 115, which may represent previously-unseen data not used to train candidate models 125.

In some examples, system 100 may use cross-validation techniques to train candidate models 125. For instance, still referring to FIG. 1, system 100 may employ a resampling procedure to evaluate each of candidate models 125, which may be particularly useful where processed data 113 is a limited data sample. As with applying candidate models 125 to test data 115, cross-validation techniques may also help estimate the skill of each of candidate models 125 on unseen data. In some examples, system 100 may implement cross-validation techniques by retraining candidate models 125 after selecting a different subset of processed data 113 as training data 114', where training data 114' is not the same as the subset previously chosen for training data 114. System 100 may, in such an example, designate the remaining data as test data 115'. In such an example, system 100 clears each of machine learning algorithms 120 of any previously-learned data, and uses training data 114' as input to each of machine learning algorithms 120. Each of machine learning algorithms 120 retrains each of candidate models 125 based on training data 114' and hyperparameters 121. System 100 then uses test data 115' as input to each of the new candidate models 125. Each of candidate models 125 generate, based on test data 115', a predicted output. Model selector 130 evaluates the predictions generated by the competing candidate models 125 and again identifies one or more chosen models 175. Model selectors 130 may use a similar technique to evaluate multiple cross-validated candidate models 125 to identify one or more final chosen models 175.

Chosen model 175 may be used to generate prediction 180 based on input data 171. For instance, with reference to FIG. 1, chosen model 175 receives input data 171. Input data 171 may be actual data from a business seeking guidance as to what an optimal liquidity level might be for the business. Input data 171 may be projected data from a business seeking to modify their corporate structure (e.g., through an acquisition, by buying back shares, by increasing a dividend, etc.). Chosen model 175, which has been trained and validated with processed data 113, evaluates input data 171 and determines, based on its training, prediction 180. Prediction 180 represents a prediction for the desired output metric for the business based on input data 171. In some examples, prediction 180 may be a liquidity level associated with the business, or a proposed size of a revolving line of credit used by the business, or a different type of output metric, such as expected future cash flows, market capitalization, and/or credit ratings for the business based on assumptions made by the management team embodied within input data 171. In some examples, prediction 180 may be communicated to a client, user, or analyst as user interface 181 presented by a computing device.

System 100 can be implemented using various tools and/or programming languages, including Python, R, Octave, Matlab, Scikit-Learn, as well as others. Public financial data may be used as source data, and many candidate models 125 may be trained using such data. As described herein, candidate models 125 may be rigorously cross-validated to ensure integrity. The resulting candidate models 125 may then compete against each other to identify the model that is most accurate at predicting optimal liquidity. In general, the most accurate model (the "chosen model" or the "winning model") is selected for use on production data, such as data received from or generated by corporate management (e.g., where the business is a client of a management consultant or investment banker). In addition, system 100 may also generate a liquidity prediction using less sophisticated methods (i.e., more traditional methods) for the purpose of comparison against the prediction(s) and other information generated by the chosen model. Accuracy may be quantified for both the liquidity projections generated by the chosen model and other methods. Further, a visual output may be produced in the form of one or more scatter plots which illustrate actual liquidity values against predicted liquidity values for some or all observations in the training data, and may be used to help corporate management understand appropriate or optimal corporate liquidity levels, cash management, debt capital markets, and other topics related to capital structure and corporate finance.

By using, to predict corporate liquidity for a given business entity, input metrics that include market capitalization, revenue, free cash flows, capital expenditures, operating expenses, credit ratings, debt and associated maturity dates (e.g., debt maturing in the next five years, debt maturing after five years), and the industry and/or sector for the business entity, system 100 may accurately predict corporate liquidity. Accordingly, by using such input metrics, system 100 may, more so than prior methods, more efficiently, intelligently, and effectively interpret and process information. Further, aspects of this disclosure may improve the operation of system 100 and the computing systems used to implement system 100 because such input metrics have been identified as being correlated with corporate liquidity, and use of such metrics in accordance with the techniques described herein may have the effect of causing system 100 to more accurately predict or model corporate liquidity.

In general, through techniques in accordance with one or more aspects of the present disclosure, such as by employing machine learning algorithms to identify optimal values of various business metrics (e.g., corporate liquidity and others), system 100 may accurately predict optimal or appropriate values for such business metrics. By more accurately predicting optimal or appropriate values for business metrics, system 100 may more efficiently interpret and process information derived from data sources 110 because machine learning algorithms that compete against each other and/or that have been cross-validated will, more so than traditional methods, accurately predict values of corporate liquidity and other business metrics. Therefore, aspects of this disclosure may improve the function of computing systems used to implement system 100 because employing machine learning algorithms to identify optimal values of various business metrics may have the effect of causing system 100 to more efficiently process data.

Figure 2:
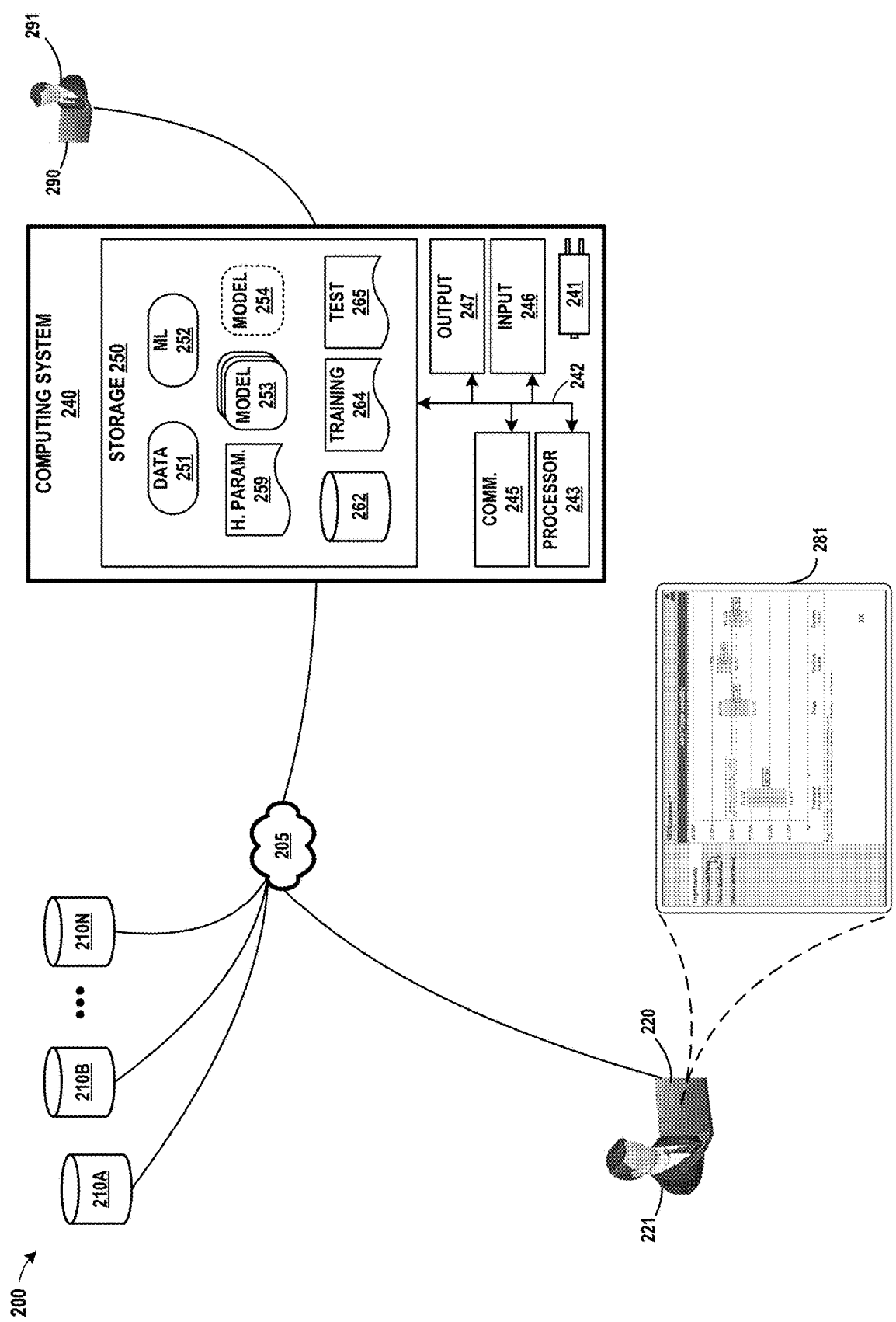
FIG. 2 is a conceptual diagram that includes a block diagram of an example computing system that generates and uses models to predict business metrics associated with a business, in accordance with one or more aspects of the present disclosure.

FIG. 2 is a conceptual diagram that includes a block diagram of an example computing system that generates and uses models to predict business metrics associated with a business, in accordance with one or more aspects of the present disclosure. System 200 of FIG. 2 may be described as an example or alternative implementation of system 100 of FIG. 1. One or more aspects of FIG. 2 may be described herein within the context of FIG. 1. In the example of FIG. 2, system 200 includes data sources 210, one or more client devices 220 (each operated by one or more users 221), and computing system 240 in communication over network 205. One or more administrator devices 290 (each operated by administrator 291) is shown directly coupled to computing system 240, but in other examples, administrator device 290 may be coupled to computing system 240 (and other systems) through network 205.

Network 205 may be the internet, or may include or represent any public or private communications network or other network. For instance, network 205 may be a cellular, Wi-Fi®, ZigBee, Bluetooth, Near-Field Communication (NFC), satellite, enterprise, service provider, and/or other type of network enabling transfer of transmitting data between computing systems, servers, and computing devices. One or more of client devices, server devices, or other devices may transmit and receive data, commands, control signals, and/or other information across network 205 using any suitable communication techniques. Network 205 may include one or more network hubs, network switches, network routers, satellite dishes, or any other network equipment. Such devices or components may be operatively inter-coupled, thereby providing for the exchange of information between computers, devices, or other components (e.g., between one or more client devices or systems and one or more server devices or systems). Each of the devices or systems illustrated in FIG. 2 may be operatively coupled to network 205 using one or more network links. The links coupling such devices or systems to network 205 may be Ethernet, Asynchronous Transfer Mode (ATM) or other types of network connections, and such connections may be wireless and/or wired connections. One or more of the devices or systems illustrated in FIG. 2 or otherwise on network 205 may be in a remote location relative to one or more other illustrated devices or systems.

Each of data sources 210 may represent any suitable source of data for use by computing system 240. In some examples, one or more of data sources 210 may represent a publicly available store or repository of financial information about a large variety of businesses, such as, for example, data made available to the public by the Securities and Exchange Commission. Such data may include or be based on submissions and/or filings by companies and others pursuant to regulatory requirements or other requirements. In other examples, one or more of data sources 210 may represent a private store of financial information about public or private companies derived from submissions by the companies or through other means.

Each of client device 220 and administrator device 290 may be implemented as any suitable computing system, such as a mobile, non-mobile, wearable, and/or non-wearable computing device. Client device 220 and administrator device 290 may each represent a smart phone, a tablet computer, a computerized watch, a computerized glove or gloves, a personal digital assistant, a virtual assistant, a gaming system, a media player, an e-book reader, a television or television platform, a bicycle, automobile, or navigation, information and/or entertainment system for a bicycle, automobile or other vehicle, a laptop or notebook computer, a desktop computer, or any other type of wearable, non-wearable, mobile, or non-mobile computing device that may perform operations in accordance with one or more aspects of the present disclosure.

Computing system 240 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 240 represents a cloud computing system, server farm, and/or server cluster (or portion thereof) that provides services to client devices and other devices or systems. In other examples, computing system 240 may represent or be implemented through one or more virtualized compute instances (e.g., virtual machines, containers) of a data center, cloud computing system, server farm, and/or server cluster.

In the example of FIG. 2, computing system 240 may include power source 241, one or more processors 243, one or more communication units 245, one or more input devices 246, one or more output devices 247, and one or more storage devices 250. Storage devices 250 may include data module 251, machine learning (ML) module 252, models 253, and hyperparameters (H. PARAM.) 259. Storage devices 250 may further include data store 262, training data 264, and test data 265. One or more of the devices, modules, storage areas, or other components of computing system 240 may be interconnected to enable inter-component communications (physically, communicatively, and/or operatively). In some examples, such connectivity may be provided by through communication channels (e.g., communication channels 242), a system bus, a network connection, an inter-process communication data structure, or any other method for communicating data.

Power source 241 may provide power to one or more components of computing system 240. Power source 241 may receive power from the primary alternating current (AC) power supply in a building, home, or other location. In other examples, power source 241 may be a battery or a device that supplies direct current (DC). In still further examples, computing system 240 and/or power source 241 may receive power from another source. One or more of the devices or components illustrated within computing system 240 may be connected to power source 241, and/or may receive power from power source 241. Power source 241 may have intelligent power management or consumption capabilities, and such features may be controlled, accessed, or adjusted by one or more modules of computing system 240 and/or by one or more processors 243 to intelligently consume, allocate, supply, or otherwise manage power.

One or more processors 243 of computing system 240 may implement functionality and/or execute instructions associated with computing system 240 or associated with one or more modules illustrated herein and/or described below. One or more processors 243 may be, may be part of, and/or may include processing circuitry that performs operations in accordance with one or more aspects of the present disclosure. Examples of processors 243 include microprocessors, application processors, display controllers, auxiliary processors, one or more sensor hubs, and any other hardware configured to function as a processor, a processing unit, or a processing device. Computing system 240 may use one or more processors 243 to perform operations in accordance with one or more aspects of the present disclosure using software, hardware, firmware, or a mixture of hardware, software, and firmware residing in and/or executing at computing system 240.

One or more communication units 245 of computing system 240 may communicate with devices external to computing system 240 by transmitting and/or receiving data, and may operate, in some respects, as both an input device and an output device. In some examples, communication unit 245 may communicate with other devices over a network. In other examples, communication units 245 may send and/or receive radio signals on a radio network such as a cellular radio network. In other examples, communication units 245 of computing system 240 may transmit and/or receive satellite signals on a satellite network such as a Global Positioning System (GPS) network. Examples of communication units 245 include a network interface card (e.g. such as an Ethernet card), an optical transceiver, a radio frequency transceiver, a GPS receiver, or any other type of device that can send and/or receive information. Other examples of communication units 245 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input devices 246 may represent any input devices of computing system 240 not otherwise separately described herein. One or more input devices 246 may generate, receive, and/or process input from any type of device capable of detecting input from a human or machine. For example, one or more input devices 246 may generate, receive, and/or process input in the form of electrical, physical, audio, image, and/or visual input (e.g., peripheral device, keyboard, microphone, camera). For computing devices that may be used by a user, one or more input devices 246 may generate or receive input from a keyboard, pointing device, voice responsive system, video camera, button, sensor, mobile input device, control pad, microphone, presence-sensitive screen, network, or any other type of device for detecting input from a human or machine. In some examples, input devices 246 may include one or more sensor components one or more location sensors (GPS components, Wi-Fi® components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, step counter sensor.

One or more output devices 247 may represent any output devices of computing system 240 not otherwise separately described herein. One or more output devices 247 may generate, receive, and/or process input from any type of device capable of detecting input from a human or machine. For example, one or more output devices 247 may generate, receive, and/or process output in the form of electrical and/or physical output (e.g., peripheral device, actuator). For computing devices that may be used by a user, one or more output devices 247 may generate, present, and/or process output in the form of tactile, audio, visual, video, and other output. Output devices 247 may include a sound card, video graphics adapter card, speaker, presence-sensitive screen, one or more USB interfaces, video and/or audio output interfaces, a display, or any other type of device capable of generating tactile, audio, visual, video, or other output (e.g., a haptic response, a sound, a flash of light, and/or images). Some devices may serve as both input and output devices. For example, a communication device may both send and receive data to and from other systems or devices over a network.

One or more storage devices 250 within computing system 240 may store information for processing during operation of computing system 240. Storage devices 250 may store program instructions and/or data associated with one or more of the modules described in accordance with one or more aspects of this disclosure. One or more processors 243 and one or more storage devices 250 may provide an operating environment or platform for such modules, which may be implemented as software, but may in some examples include any combination of hardware, firmware, and software. One or more processors 243 may execute instructions and one or more storage devices 250 may store instructions and/or data of one or more modules. The combination of processors 243 and storage devices 250 may retrieve, store, and/or execute the instructions and/or data of one or more applications, modules, or software. Processors 243 and/or storage devices 250 may also be operably coupled to one or more other software and/or hardware components, including, but not limited to, one or more of the components of computing system 240 and/or one or more devices or systems illustrated as being connected to computing system 240.

In some examples, one or more storage devices 250 are temporary memories, meaning that a primary purpose of the one or more storage devices is not long-term storage. Storage devices 250 of computing system 240 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 250, in some examples, also include one or more computer-readable storage media. Storage devices 250 may be configured to store larger amounts of information than volatile memory. Storage devices 250 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories.

Data module 251 may perform functions relating to communicating with one or more data sources 210 and collecting, parsing, categorizing, and/or processing financial and/or business data that can be used to train and/or evaluate machine learning models. In some examples, data module 251 may perform searches for financial information about a business for which a predicted output metric is sought, or about other businesses that may be similarly situated. Data module 251 may process data in preparation for use in training and evaluating machine learning modules, and may store such data within data store 262. In some examples, machine learning module 252 may split data stored within 262 into training data 264 and/or test data 265.

Machine learning module 252 may perform functions relating to training and/or evaluating models 253, selecting one or more chosen models 254, and generating predicted output metrics. Machine learning module 252 may further receive information for use in tuning one or more machine learning models, and machine learning module 252 may store such information as hyperparameters 259. Machine learning module 252 may use training data 264 to generate a plurality of models 253, each of which are trained using training data 264. In some examples, machine learning module 252 may generate models using machine learning algorithms and techniques that include Ridge Regression, Lasso Regression, Gradient Descent and/or Gradient Boosting Regression, ElasticNet regularization, Random Forest learning methods, and/or other techniques. Machine learning module 252 may evaluate the skill of each of models 253 by comparing the output predicted by each of models 253 based on input metrics included within test data 265 to the actual value of that output metric included within test data 265. Machine learning module 252 may choose one or more of models 253 and designates such model(s) as chosen model 254, suitable for use in predicting a given output metric based on appropriate input metrics. Machine learning module 252 may receive information that corresponds to a request to generate a predicted output metric based on input metrics. Machine learning module 252 may present the input metrics to chosen model 254, and receive, in response, a predicted output metric. Machine learning module 252 may cause communication unit 245 to output, over network 205, information that can be used to generate a user interface that includes information about the predicted output metric.

Models 253 may correspond to models generated by machine learning module 252 based on data stored within data store 262 and/or training data 264. In some examples, some of models 253 may be generated using the same machine learning algorithm, but where a different set of hyperparameters 259 are used to alter, tune, or otherwise modify the machine learning algorithm so that multiple models 253 may result from the same type of algorithm. Further models 253 may be generated using cross-validation techniques to help ensure the integrity of models 253 and to help ensure negative effects of underfitting and overfitting training data 264 are avoided.

One or more chosen models 254 may correspond to optimal, preferred, and/or winning algorithms selected by machine learning module 252 as a result of a comparison of the skill of each of models 253 in predicting a desired output metric based on a set of input metrics. In some examples, and after selection, one or more chosen models 254 are used for predicting output metrics based on input metrics provided by a business or an advisor to a business. Other models 253 not included within the one or more chosen models 254 may be disregarded, and not thereafter used for predicting output metrics using new input metrics.

Hyperparameters 259 may correspond to machine learning algorithm parameters relating to constraints, weights, and/or learning rates as applied to different. Hyperparameter values are often established prior to training a machine learning algorithm using a data set (e.g., training data 264). In one example, LASSO is an algorithm that adds a regularization hyperparameter to ordinary least squares regression, which typically is established before estimating the parameters through the machine learning algorithm. Different machine learning algorithms may require different hyperparameters, although some simple algorithms (e.g., ordinary least squares regression) may require no hyperparameters. Typically, hyperparameters are tuned so that a machine learning algorithm or model can optimally solve the machine learning problem. Hyperparameters 259 may include information derived from information received in communications with administrator devices 290 and/or from other sources.

Data store 262 may represent any suitable data structure or storage medium for storing data used to train and/or evaluate one or more models 253. The information stored in data store 262 may be searchable and/or categorized such that one or more modules within computing system 240 may provide an input requesting information from data store 262, and in response to the input, receive information stored within data store 262. In some examples, data store 262 may store, for a large group of businesses, information about those businesses' corporate liquidity, market capitalization, revenue, free cash flows, capital expenditures, operating expenses, credit ratings, debt and associated maturity dates (e.g., debt maturing in the next five years, debt maturing after five years), EBITDA ("Earnings Before Interest, Taxes, Depreciation and Amortization") data, and the industry and/or sector for the business. Data store 262 may also store projected information about future cash flows, future market capitalization values, and future credit ratings. Often, such data may be retrieved from publicly-available databases that publish information submitted by businesses pursuant to regulatory filings. Data store 262 may be primarily maintained by data module 251. Data store 262 may receive from data module 251 information from one or more data sources 210. Data store 262 may provide other modules with access to the data stored within data store 262, and/or may analyze the data stored within data store 262 and output such information on behalf of other modules of computing system 240.

Training data 264 may represent a set of data, derived from data store 262, that is used by machine learning module 252 to train models 253. Test data 265 may represent a set of data, also derived from data store 262, that is used to evaluate models 253. In some examples, training data 264 may include information about corporate liquidity for a set of businesses, which may serve as an output metric in a supervised machine learning algorithm that uses input metrics including information about market capitalization, revenue, free cash flows, capital expenditures, operating expenses, credit ratings, debt and associated maturity dates, and the industry and/or sector for those same businesses. Similarly, test data 265 may also include information about corporate liquidity for a different set of businesses, as well as the same type of input metrics as those in training data 264.

In the example of FIG. 2, and in accordance with one or more aspects of the present disclosure, computing system 240 may collect data that can be used to train machine learning models. For instance, in FIG. 2, data module 251 causes communication unit 245 to output a signal over network 205. One or more of data sources 210 detect a signal and determine that the signal corresponds to a request for data. One or more of data sources 210 respond to the signal by outputting, over network 205, a signal responsive to the request. Communication unit 245 detects a signal over network 205 and outputs to data module 251 an indication of the signal. Data module 251 determines that the signal includes financial and/or business data that can be used to train machine learning models to predict one or more metrics associated with a business entity. Data module 251 further determines that the signal includes financial and/or business data that can be used to evaluate the machine learning models. Data module 251 processes the data in preparation for use in training and evaluating machine learning models. Data module 251 stores the data within data store 262. In some examples, data module 251 splits the data into training data 264 and test data 265 for later use in training and evaluating models 253, respectively.

Computing system 240 may receive information about one or more hyperparameters that may be used when training machine learning models. For instance, again with reference to FIG. 2, input device 246 detects input from administrator device 290 (operated by administrator 291) and outputs to machine learning module 252 an indication of input. Machine learning module 252 determines that the input corresponds to data for use in tuning machine learning models. Machine learning module 252 stores the data as hyperparameters 259. In the example described, administrator device 290 may be part of or directly coupled to computing system 240. In other examples, however, administrator device 290 might communicate with computing system 240 over network 205. Accordingly, administrator device 290 may be remotely located relative to computing system 240.

Computing system 240 may train a plurality of models 253. For instance, in FIG. 2, machine learning module 252 accesses training data 264, and applies a plurality of machine learning algorithms to training data 264. For one or more of such algorithms, machine learning module 252 accesses hyperparameters 259 and uses hyperparameters 259 to tune the machine learning algorithm. Accordingly, by using various hyperparameters 259 for a given machine learning algorithm, multiple models 253 may be generated from one machine learning algorithm. Accordingly, as a result of processing, machine learning module 252 generates a plurality of models 253, each trained by training data 264.

Computing system 240 may evaluate models 253. For instance, in still referring to FIG. 2, machine learning module 252 accesses test data 265 and applies models 253 to input metrics included within test data 265 to generate a plurality of predicted output metrics. Machine learning module 252 compares the predicted output metrics to the output metrics included within test data 265. Based on the comparison, machine learning module 252 evaluates the skill of each of models 253.

Computing system 240 may cross-validate models 253. In some examples, computing system 240 may repeat the process of training models 253 by selecting different sets of data for training data 264 and test data 265. In such an example, data module 251 again splits data stored within data store 262 into a different set of training data 264 and test data 265. Machine learning module 252 accesses the new training data 264 and applies the machine learning algorithms to training data 264 (and for some of such algorithms, machine learning module 252 uses hyperparameters 259 to tune the algorithms). Machine learning module 252 generates models 253, and uses the new test data 265 to generate a plurality of predicted output metrics. Machine learning module 252 compares the predicted output metrics to the output metrics included within the new test data 265. Based on this cross-validated comparison in addition to the original comparison, machine learning module 252 evaluates the skill of each of models 253.

Computing system 240 may select one or more models 253. For instance, in FIG. 2, machine learning module 252 compares the evaluated models 253, and determines which of models 253 have exhibited the best performance or skill in predicting the desired output metric. Machine learning module 252 chooses one or more of such models and designates such model(s) as chosen model 254, suitable for use in predicting a given output metric based on appropriate input metrics.

System 200 may use chosen model 254 to generate a prediction. For instance, still referring to the example of FIG. 2, client device 220 detects input generated by user 221. Client device 220 outputs a signal over network 205. Communication unit 245 detects a signal and outputs an indication of a signal to machine learning module 252. Machine learning module 252 determines that the signal corresponds to a request to generate a predicted output metric based on input metrics that are also included within the signal. Machine learning module 252 presents the input metrics to chosen model 254, and receives, in response, a predicted output metric.

System 200 may present the prediction in a user interface. Machine learning module 252 causes communication unit 245 to output a signal over network 205. Client device 220 detects a signal over network 205. Client device 220 determines that the signal includes information sufficient to present a user interface. Client device 220 presents user interface 281, which includes the prediction generated by computing system 240.

Modules illustrated in FIG. 2 (e.g., data module 251, machine learning module 252, and models 253) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 3A:
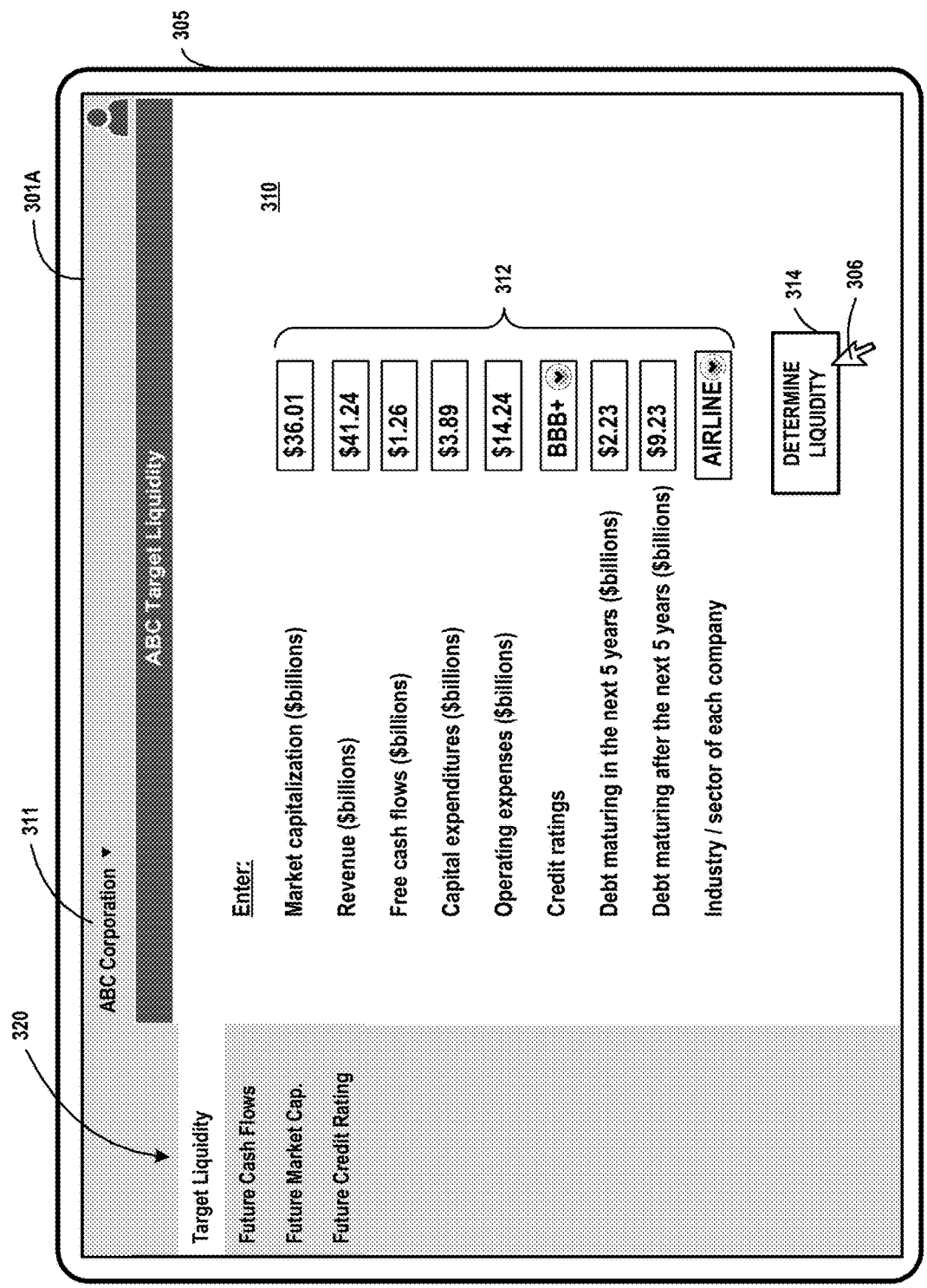
FIG. 3A and FIG. 3B are conceptual diagrams illustrating example user interfaces presented by a user interface device in accordance with one or more aspects of the present disclosure.
Figure 3B:
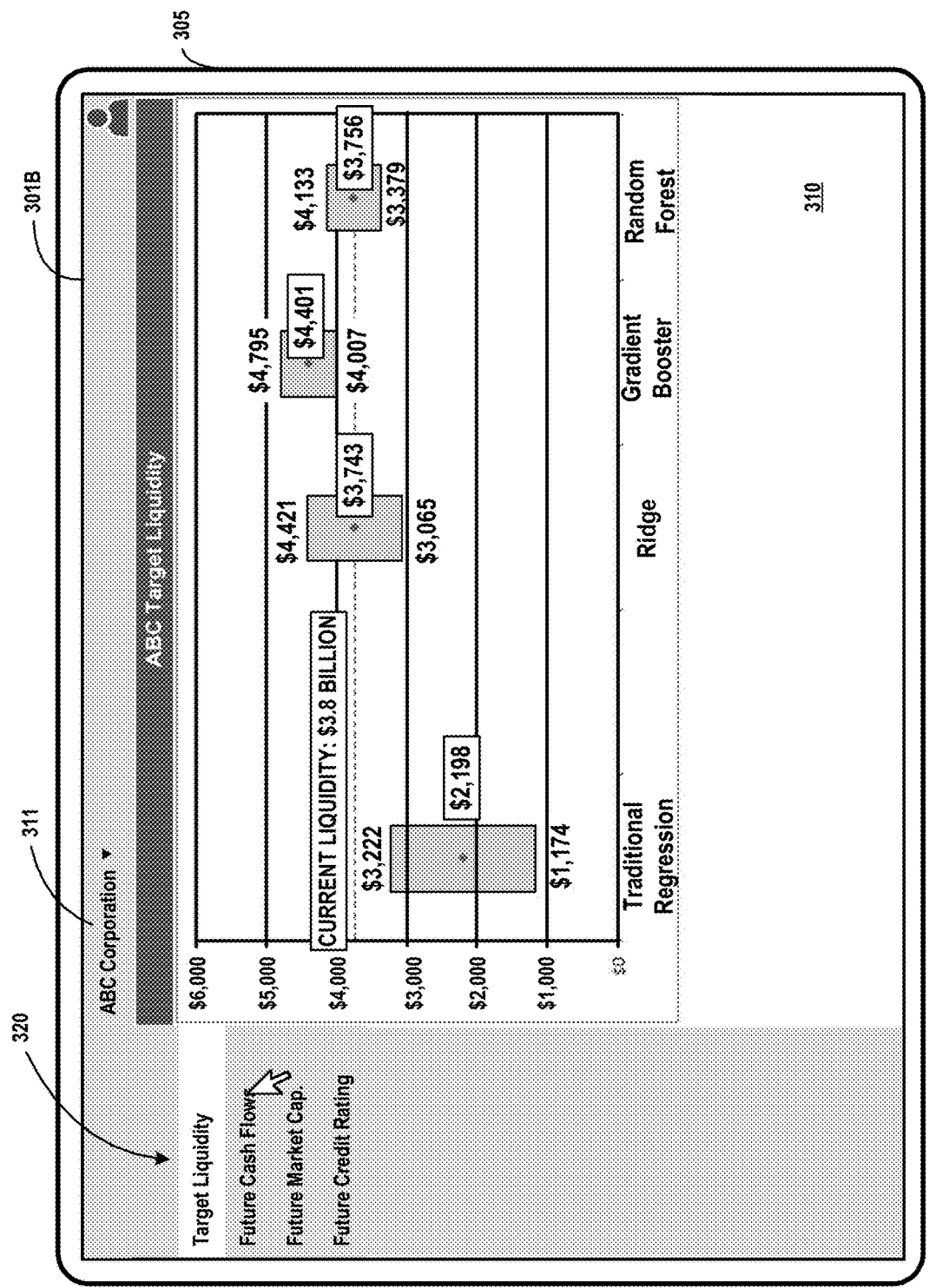

FIG. 3A and FIG. 3B are conceptual diagrams illustrating example user interfaces presented by a user interface device in accordance with one or more aspects of the present disclosure. User interface 301A (as illustrated in FIG. 3A) or user interface 301B (as illustrated in FIG. 3B) may correspond to user interface 181 presented by client device 220 of FIG. 2, and may present instructions, prompts, and/or information to a user of client device 220. One or more aspects of the user interfaces illustrated in FIG. 3A and FIG. 3B may be described herein within the context of system 100 of FIG. 1 and/or system 200 of FIG. 2.

Each of user interfaces 301A and 301B are simplified user interfaces presented for purposes of example. For ease of illustration, many features of user interfaces 301A and 301B that may be part of actual user interfaces in an implemented system as well as additional user interfaces that may be part of an implemented system are omitted. Further, although the user interfaces illustrated in FIG. 3A and FIG. 3B are shown as graphical user interfaces, other types of interfaces may be presented in other examples, including a text-based user interface, a console or command-based user interface, a voice prompt user interface, or any other appropriate user interface.

FIG. 3A illustrates an example user interface that may be presented by client device 220, operated by user 221. For instance, with reference to an example that can be described in the context of FIG. 2, client device 220 detects input from user 221. In some examples, user 221 may be a corporate manager of an entity named "ABC Corporation." In other examples, user 221 may be a banker, or business analyst. In response to detecting the input, client device 220 outputs a signal over network 205. Communication unit 245 of computing system 240 detects a signal and outputs an indication of the signal to machine learning module 252. Machine learning module 252 of computing system 240 determines that the signal corresponds to a request for information about target liquidity for ABC Corporation. Machine learning module 252 causes communication unit 245 to output one or more signals over network 205. Client device 220 detects a signal over network 205 and determines that the signal includes information sufficient to generate a user interface. Client device 220 generates data associated with a user interface and presents user interface 301A, as shown in FIG. 3A, at a display associated with client device 220.

In the example of FIG. 3A, user interface 301A is presented within window 305, and includes sidebar 320 and main display region 310. Along the top of main display region 310 is drop-down user interface component 311. Drop-down user interface component 311 may be used to select a client, corporation, and/or other entity for evaluation or analysis.

Sidebar 320 provides an indication of which user interface mode is being presented within user interface 301A. As illustrated in FIG. 3A, and as further described herein, sidebar 320 may indicate one of several modes, including "Target Liquidity" mode, "Future Cash Flows" mode, "Future Market Cap." mode, and "Future Credit Rating" mode. The illustrated modes are examples, and many additional modes may be used.

In the example of FIG. 3A, sidebar 320 shows that a "Target Liquidity" mode is presented within user interface

301A. Main display region 310 includes input fields 312, which prompt user 221 to provide information in order to determine target liquidity for ABC Corporation. As shown in FIG. 3A, input fields 312 prompt a user for input metrics associated with ABC Corporation, including ABC Corporation's market capitalization, revenue, free cash flows, capital expenditures, operating expenses, credit ratings, debt maturity information, and information about the industry and/or sector in which ABC Corporation operates. Button 314, selectable by cursor 306, prompts user 221 to submit information entered within input fields 312 in order to determine a liquidity value.

FIG. 3B illustrates an example user interface that may be presented by client device 220 to provide information about an output metric (i.e., target liquidity) generated by a model using the input metrics entered within input fields 312 of FIG. 3A. For instance, with reference to FIG. 2 and FIG. 3A, client device 220 detects input and outputs one or more signals over network 205. Communication unit 245 of computing system 240 detects a signal and outputs an indication of the signal to machine learning module 252. Machine learning module 252 determines that the signal corresponds to an indication that button 314 has been selected within main display region 310 of user interface 301A. Machine learning module 252 further determines that the signal includes input metrics that can be used by chosen model 254 (or models 253) to generate a liquidity prediction. Machine learning module 252 causes chosen model 254 to generate a prediction. Machine learning module 252 receives the result and causes communication unit 245 to output a signal over network 205. Client device 220 detects a signal and determines that the signal is sufficient to generate a user interface. Client device 220 generates data associated with a user interface and presents user interface 301B, as shown in FIG. 3B, at the display associated with client device 220.

In the example of FIG. 3B, user interface 301B includes a plurality of liquidity predictions, illustrated within main display region 310, generated by chosen models 253 of computing system 240. Each prediction may be presented as a range by quantifying the accuracy or expected prediction error associated with the prediction. In FIG. 3B, predictions generated by models identified as "Ridge," "Gradient Booster," and "Random Forest" are illustrated. Others may be included in other examples. Also in FIG. 3B, user interface 301B presents a liquidity prediction using a traditional or less sophisticated method (e.g., by simply using a median ratio of liquidity to free cash flow or liquidity to EBITDA). Less sophisticated methods, however, are likely to provide significantly inferior, less accurate, and/or less optimal predicted values for liquidity. The information presented within user interface 301B and/or described herein may provide, or be used to provide, advice on liquidity, cash management, debt capital markets, and other topics related to capital structure and corporate finance. Although not shown in FIG. 3B, user interface 301B may, in some examples, describe the cost savings to be gained by reducing ABC Corporation's line of credit, or the cost for increasing ABC's line of credit. Further, in some examples, user interface 301B (or another user interface) may present information including scatter plots that illustrate actual liquidity values against predicted liquidity values for some or all observations in the training data.

Figure 4A:
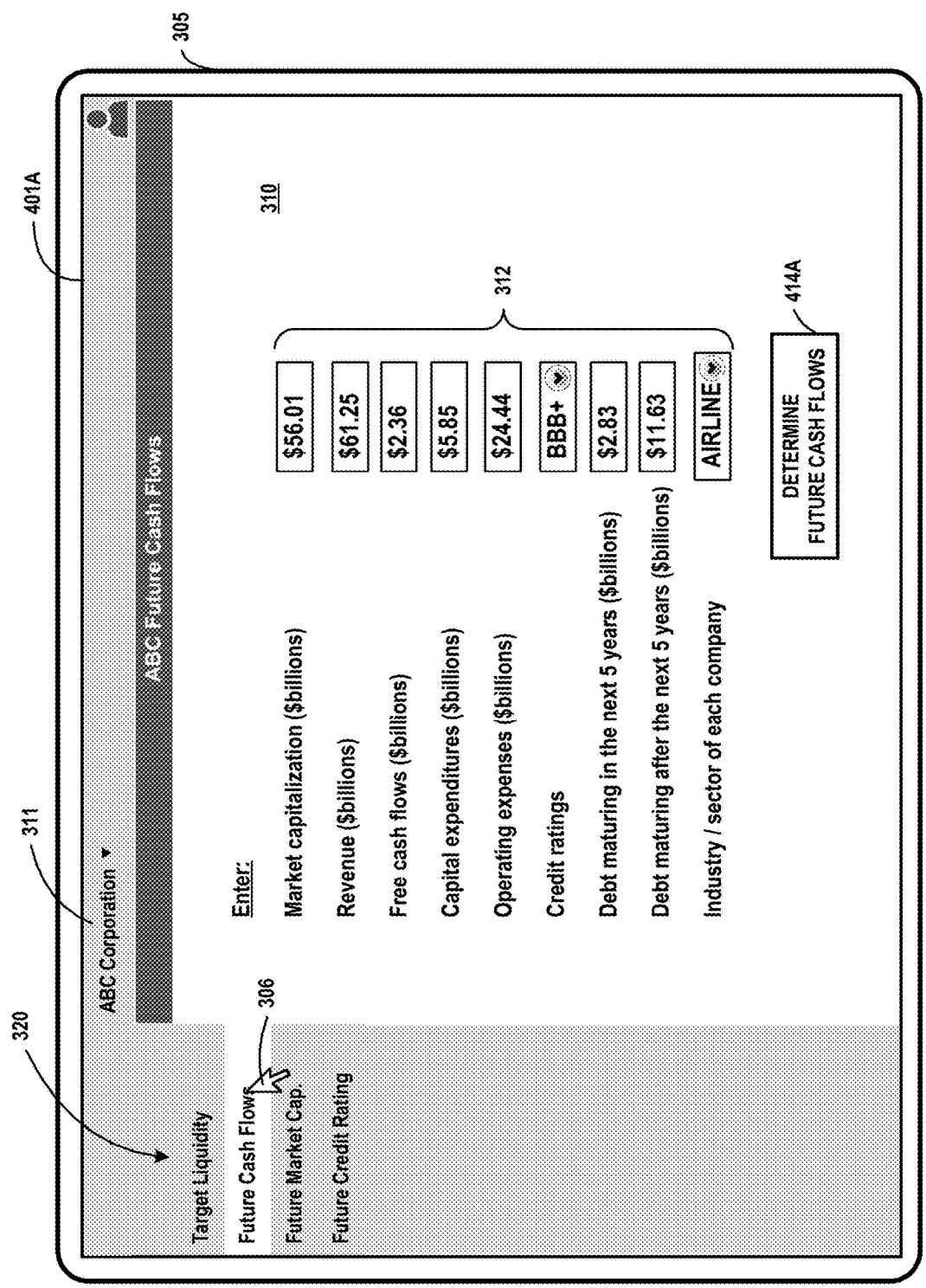
FIG. 4A, FIG. 4B, and FIG. 4C are conceptual diagrams illustrating example user interfaces presented by a user interface device in accordance with one or more aspects of the present disclosure.
Figure 4B:
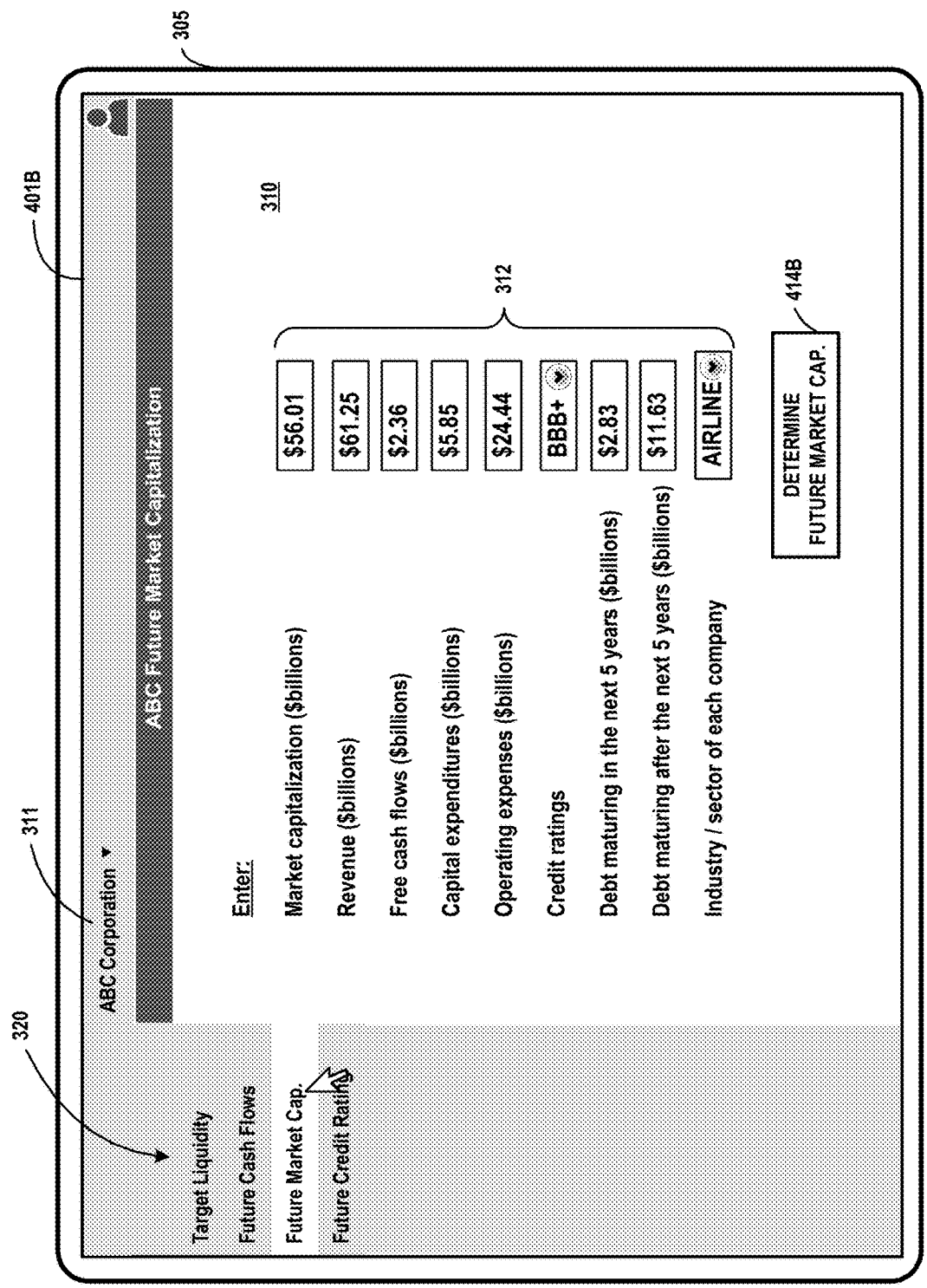
Figure 4C:
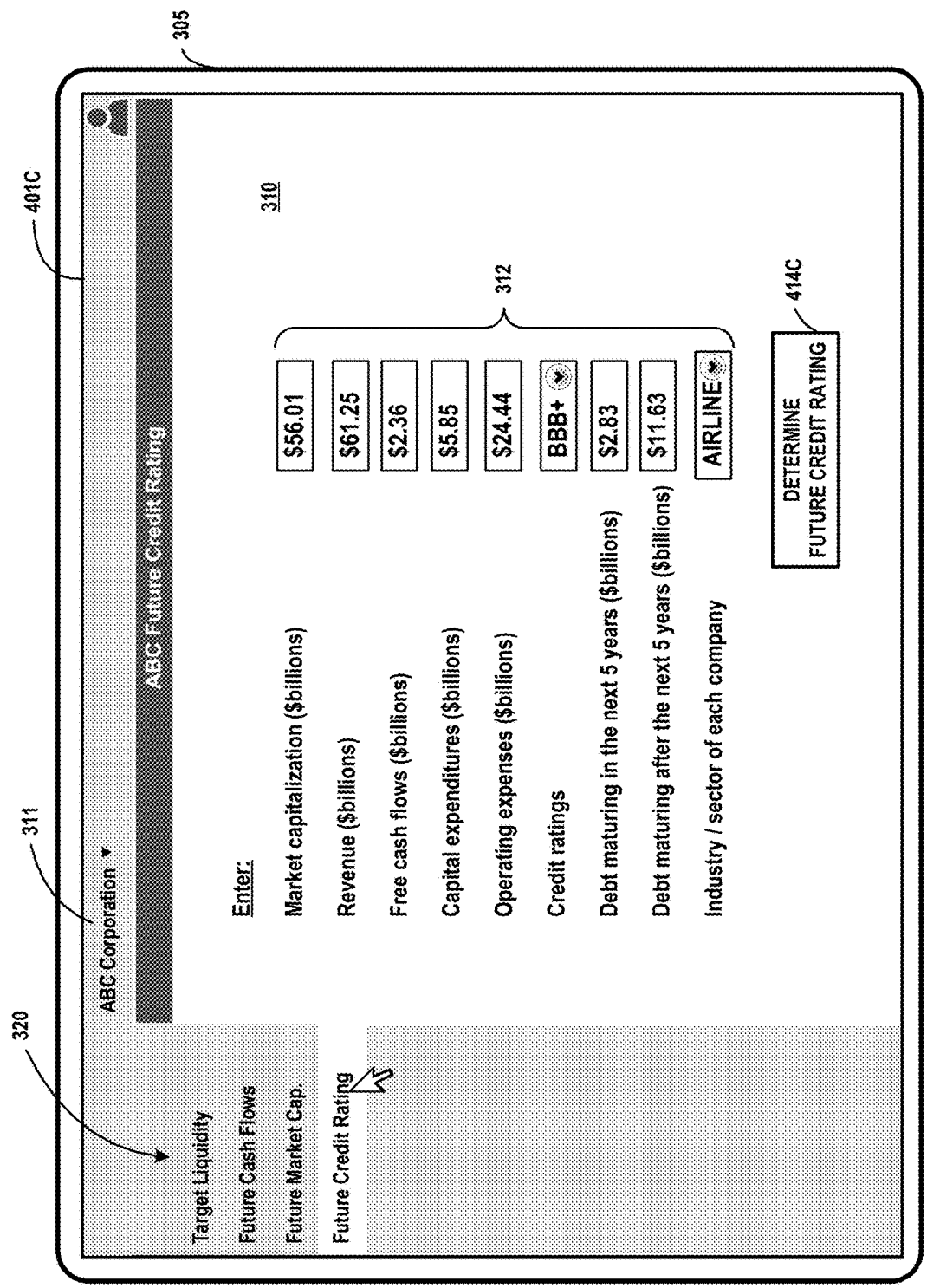

FIG. 4A, FIG. 4B, and FIG. 4C are conceptual diagrams illustrating example user interfaces presented by a user interface device in accordance with one or more aspects of the present disclosure. Each of the user interfaces illustrated in FIG. 4A, FIG. 4B, and FIG. 4C illustrate selection of different modes, enabling prediction of other types of output metrics based on the same data fields collected in FIG. 3A. As in FIG. 3A and FIG. 3B, each of FIG. 4A, FIG. 4B, and FIG. 4C includes a user interface (user interface 401A in FIG. 4A, user interface 401B in FIG. 4B, and user interface 401C in FIG. 4C) presented within window 305, where the user interface includes sidebar 320 and main display region 310, navigable by cursor 306. Main display region 310 includes input fields 312, and sidebar 320 shows the same user interface modes as in FIG. 3A.

FIG. 4A illustrates an example user interface that prompts a user to enter input metrics and cause a "Future Cash Flows" prediction to be generated based on the input metrics. For instance, with reference to FIG. 3B and FIG. 2, and while user interface 301B of FIG. 3B is presented at client device 220, client device 220 detects input and in response, outputs a signal over network 205. Communication unit 245 of computing system 240 detects a signal and outputs an indication of the signal to machine learning module 252. Machine learning module 252 of computing system 240 determines that the signal corresponds to input indicating that user 221 has selected the "Future Cash Flows" mode in sidebar 320 (see cursor 306 in FIG. 3B). Machine learning module 252 causes communication unit 245 to output one or more signals over network 205. Client device 220 detects a signal over network 205 and determines that the signal includes information sufficient to generate a user interface. Client device 220 generates data associated with a user interface and presents user interface 401A, as shown in FIG. 4A, within window 305. In the example shown, a user of client device 220 may complete fields 312 with projected financial data expected after an expected change to corporate structure (e.g., an acquisition, share repurchase, or a dividend change). In the example shown, the fields 312 relevant to predicting future cash flows are the same as those illustrated in FIG. 3A. In other examples, however, user interface 401A may prompt a user for different information by providing more, fewer, or a different set of fields 312.

In a manner similar to that illustrated in FIG. 3B, computing system 240 may, in response to user 221 completing the information in input fields 312 and selecting button 414A, may cause a user interface presenting a predicted future cash flow, based on information provided within input fields 312 of FIG. 4A, to be presented within window 305.

Similarly, FIG. 4B illustrates an example user interface that prompts a user to enter input metrics and cause a "Future Market Cap." prediction to be generated based on the input metrics. FIG. 4C illustrates an example user interface that prompts a user to enter input metrics and cause a "Future Credit Rating" prediction to be generated based on input metrics. In each case, computing system 240 may, in response to user 221 completing the information in input fields 312 and selecting button 414B or button 414C, cause an appropriately trained model to generate a prediction about predicted future market capitalization (FIG. 4B) or future credit ratings (FIG. 4C). Although in FIG. 4A, FIG. 4B, and FIG. 4C user 221 is prompted to provide the same types of data in input fields 312, in other examples, a user interface may prompt user 221 for additional and/or different input fields.

Figure 5:
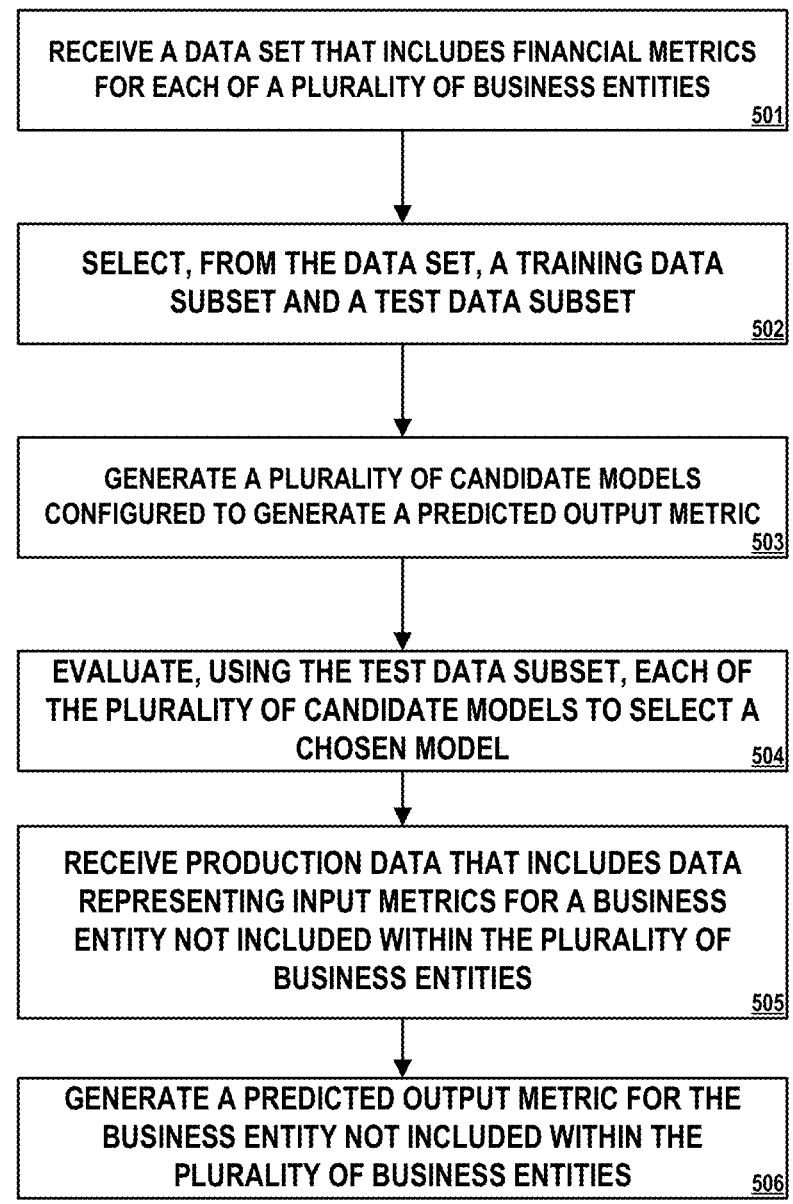
FIG. 5 is a flow diagram illustrating operations performed by an example computing system in accordance with one or more aspects of the present disclosure

FIG. 5 is a flow diagram illustrating operations performed by an example computing system in accordance with one or more aspects of the present disclosure. FIG. 5 is described below within the context of computing system 240 of FIG. 2. In other examples, operations described in FIG. 5 may be performed by one or more other components, modules, systems, or devices. Further, in other examples, operations described in connection with FIG. 5 may be merged, performed in a difference sequence, omitted, or may encompass additional operations not specifically illustrated or described.

In the process illustrated in FIG. 5, and in accordance with one or more aspects of the present disclosure, computing system 240 may receive a data set that includes financial metrics for each of a plurality of business entities, wherein the financial metrics include an output metric and a plurality of input metrics for each of the plurality of business entities, and wherein the output metric is correlated with each of the plurality of input metrics (501). For instance, in some examples, and with reference to FIG. 2, data module 251 causes communication unit 245 to output a signal over network 205. One or more of data sources 210 detect a signal and determine that the signal corresponds to a request for data. One or more of data sources 210 respond to the signal by outputting, over network 205, a signal responsive to the request. Communication unit 245 detects a signal over network 205 and outputs to data module 251 an indication of the signal. Data module 251 determines that the signal includes financial information about each of a large number of business enterprises or business entities. For each such business enterprise, the information might include data about corporate liquidity, as well as information that tends to be correlated with corporate liquidity, such as market capitalization, revenue, free cash flows, capital expenditures, operating expenses, credit ratings, debt and associated maturity dates, and the industry and/or sector for the business. In some examples, the corporate liquidity data for a given business is considered "output data" to be predicted from the other correlated information ("input data") about that business. Data module 251 may store the data within data store 262.

Computing system 240 may select, from the data set, a training data subset and a test data subset, wherein the training data subset includes the output metric and the plurality of input metrics for each of the business entities in an entity subset of the plurality of business entities, and wherein the test subset includes the output metric and the plurality of input metrics for each of the business entities that are not in the entity subset of the plurality of business entities (502). For instance, in some examples, data module 251 splits the data into training data 264 and test data 265. Where the data includes information about 1000 business, for example, training data 264 might randomly select 800 of the businesses, may include within training data 264 the liquidity data (the "output metrics") and the correlated financial information (the "input metrics") for each of those 800 businesses. The financial information for the remaining 200 businesses (both the liquidity data and the input metrics) might be stored as test data 265.

Computing system 240 may generate a plurality of candidate models configured to generate a predicted output metric, wherein each of the plurality of candidate models is generated by applying each of a plurality of machine learning algorithms to the training data subset (503). For instance, in some examples, machine learning module 252 of computing system 240 accesses training data 264, and applies a plurality of machine learning algorithms to training data 264. For one or more of such algorithms, machine learning module 252 accesses hyperparameters 259 and uses hyperparameters 259 to tune the machine learning algorithm. As a result of processing the data, machine learning module 252 generates a plurality of models 253, trained by training data 264.

Computing system 240 may evaluate, using the test data subset, each of the plurality of candidate models to select a chosen model (504). For instance, in some examples, machine learning module 252 accesses test data 265 and uses models 253 to generate a plurality of predicted corporate liquidity values. Each of models 253 uses, as inputs to each model, the information in test data 265 associated with each business that is correlated with corporate liquidity, such as market capitalization, revenue, free cash flows, capital expenditures, operating expenses, credit ratings, debt and associated maturity dates, and the industry and/or sector for the business. Machine learning module 252 compares the predicted corporate liquidity value for each business to the actual corporate liquidity value within test data 265 to evaluate the skill of each of the candidate models. The candidate model that exhibits the highest skill level (i.e., the model having predicted liquidity values that are closest to the actual liquidity values) is chosen for use in later predictions or in production. In other words, the chosen model might be used when advising corporate management on what an appropriate corporate liquidity value should be (or a corporate liquidity value that is consistent with comparable or similarly-situated businesses). The chosen model might also be used when advising corporate management on what an expected corporate liquidity value might be after an action affecting corporate structure (e.g., an acquisition, share buyback, dividend increase, or other corporate restructuring event).

Computing system 240 may receive production data that includes data representing input metrics for a business entity not included within the plurality of business entities (505). For instance, in some examples, communication unit 245 detects one or more signals over network 205 and outputs to machine learning module 252 an indication of the signal. Machine learning module 252 determines that the signal corresponds to a request to generate a predicted corporate liquidity value based on projected financial metrics for a business. Machine learning module 252 further determines that the signal includes information about the projected financial metrics, which may include information about market capitalization, revenue, free cash flows, capital expenditures, operating expenses, credit ratings, debt and associated maturity dates, and/or the industry and/or sector for the business.

Computing system 240 may generate a predicted output metric for the business entity not included within the plurality of business entities, wherein the predicted output metric is generated by causing the chosen model to generate the predicted output metric based on the production data (506). For instance, in some examples, machine learning module 252 presents the projected financial metrics to chosen model 254. In response, chosen model 254 generates a predicted corporate liquidity value. In some examples, computing system 240 may output a user interface that includes the prediction and/or information about the prediction.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of devices (e.g., data sources 210, client devices 220, computing systems 240, administrator devices 290, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein (e.g., FIG. 1 and/or FIG. 2) as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
receiving, by a computing system, a data set that includes financial metrics for each of a plurality of business entities, wherein the financial metrics include an output metric and a plurality of input metrics for each of the plurality of business entities, wherein the output metric is a corporate liquidity metric, wherein the input metrics include market capitalization and revenue, and wherein the corporate liquidity metric is correlated with each of the plurality of input metrics;
selecting, by the computing system and from the data set, a training data subset and a test data subset, wherein the training data subset includes the corporate liquidity metric and the plurality of input metrics for each of the business entities in an entity subset of the plurality of business entities, and wherein the test data subset includes the corporate liquidity metric and the plurality of input metrics for each of the business entities that are not in the entity subset of the plurality of business entities;
generating, by the computing system, a plurality of candidate models configured to generate predicted corporate liquidity values, wherein each of the plurality of candidate models is generated by training each of a plurality of machine learning algorithms using the training data subset, wherein each of the plurality of machine learning algorithms is a different machine learning algorithm type that applies a different learning method to perform supervised learning;
cross-validating, by the computing system, each of the candidate models by retraining each of the candidate models using a different training data subset from the data set, and assessing predictive skill of each of the candidate models using a different test data subset from the data set;
selecting, by the computing system, a plurality of chosen models from the plurality of candidate models based on the assessed predictive skill of each of the candidate models determined from cross-validating each of the candidate models;
receiving, by the computing system, production data that includes data representing input metrics for a business entity not included within the plurality of business entities;
generating, by the computing system, a plurality of predicted corporate liquidity values for the business entity not included within the plurality of business entities, wherein the plurality of predicted corporate liquidity values is generated by causing each of the plurality of chosen models to generate a respective predicted corporate liquidity value based on the production data; and
outputting, by the computing system, a user interface that presents, within a single view, a chart illustrating a current corporate liquidity level for the business entity, and illustrating, for each of the different machine learning algorithm types, a respective predicted corporate liquidity value and a range of predicted values that is illustrated in the chart through a scatter plot of predicted values, wherein the range provides information about expected prediction error for each of the predicted corporate liquidity values, and wherein the chart further includes information enabling comparison of the predicted corporate liquidity values to traditional methods of predicting corporate liquidity.

2. The method of claim 1, wherein generating the plurality of candidate models includes:
applying a plurality of hyperparameters to at least some of the plurality of machine learning algorithms.

3. The method of claim 1, wherein, for each of the plurality of business entities, the input metrics further include:
free cash flows, capital expenditures, operating expenses, credit ratings, debt maturity information, and the industry for each of the plurality of business entities.

4. The method of claim 3, wherein the output metric further includes at least one of future cash flows, future market capitalization, or future credit ratings.

5. The method of claim 1, wherein the input metrics include projected financial information.

6. The method of claim 1,
wherein the data set includes data derived from public filings submitted by each of the plurality of business entities.

7. A system comprising:
a storage device; and
processing circuitry having access to the storage device and configured to:
receive a data set that includes financial metrics for each of a plurality of business entities, wherein the financial metrics include an corporate liquidity metric and a plurality of input metrics for each of the plurality of business entities, wherein the output metric is a corporate liquidity metric, wherein the input metrics include free cash flows and capital expenditures, and wherein the corporate liquidity metric is correlated with each of the plurality of input metrics,
select, from the data set, a training data subset and a test data subset, wherein the training data subset includes the corporate liquidity metric and the plurality of input metrics for each of the business entities in an entity subset of the plurality of business entities, and wherein the test data subset includes the corporate liquidity metric and the plurality of input metrics for each of the business entities that are not in the entity subset of the plurality of business entities,
generate a plurality of candidate models configured to generate predicted corporate liquidity values, wherein each of the plurality of candidate models is generated by training each of a plurality of machine learning algorithms using the training data subset, wherein each of the plurality of machine learning algorithms is a different machine learning algorithm type that applies a different learning method to perform supervised learning,
cross-validate each of the candidate models by retraining each of the candidate models using a different training data subset from the data set, and assessing predictive skill of each of the candidate models using a different test subset from the data set,
select a plurality of chosen models from the plurality of candidate models based on the assessed predictive skill of each of the candidate models determined from cross-validating each of the candidate models, receive production data that includes data representing input metrics for a business entity not included within the plurality of business entities, generate a plurality of predicted corporate liquidity values for the business entity not included within the plurality of business entities, wherein the plurality of predicted corporate liquidity values is generated by causing each of the plurality of chosen models to generate a respective predicted corporate liquidity value based on the production data; and output a user interface that presents, within a single view, a chart illustrating a current corporate liquidity level for the business entity, and illustrating, for each of the different machine learning algorithm types, a respective predicted corporate liquidity value and a range of predicted values that is illustrated in the chart through a scatter plot of predicted values, wherein the range provides information about expected prediction error for each of the predicted corporate liquidity values, and wherein the chart further includes information enabling comparison of the predicted corporate liquidity values to traditional methods of predicting corporate liquidity.

8. The system of claim 7, wherein to generate the plurality of candidate models, the processing circuitry is further configured to:

apply a plurality of hyperparameters to at least some of the plurality of machine learning algorithms.

9. The system of claim 7, wherein, for each of the plurality of business entities, the input metrics further include:

market capitalization, revenue, operating expenses, credit ratings, debt maturity information, and the industry for each of the plurality of business entities.

10. The system of claim 9, wherein the output metric includes at least one of future cash flows, future market capitalization, or future credit ratings.

11. The system of claim 7, wherein the input metrics include projected financial information.

12. The system of claim 7, wherein the data set includes data derived from public filings submitted by each of the plurality of business entities.

13. A computer-readable storage medium comprising instructions that, when executed, configure processing circuitry of a computing system to:

receive a data set that includes financial metrics for each of a plurality of business entities, wherein the financial metrics include an output metric and a plurality of input metrics for each of the plurality of business entities, wherein the output metric is a corporate liquidity metric, wherein the input metrics include operating expenses and debt maturity information, and wherein the corporate liquidity metric is correlated with each of the plurality of input metrics;

select, from the data set, a training data subset and a test data subset, wherein the training data subset includes the corporate liquidity metric and the plurality of input metrics for each of the business entities in an entity subset of the plurality of business entities, and wherein the test subset includes the corporate liquidity metric and the plurality of input metrics for each of the business entities that are not in the entity subset of the plurality of business entities;

generate a plurality of candidate models configured to generate a predicted corporate liquidity values, wherein each of the plurality of candidate models is generated by training each of a plurality of machine learning algorithms using the training data subset, wherein each of the plurality of machine learning algorithms is a different machine learning algorithm type that applies a different learning method to perform supervised learning;

cross-validate each of the candidate models by retraining each of the candidate models using a different training data subset from the data set, and assessing predictive skill of each of the candidate models using a different test subset from the data set;

select a plurality of chosen models from the plurality of candidate models based on the assessed predictive skill of each of the candidate models determined from cross-validating each of the candidate models;

receive production data that includes data representing input metrics for a business entity not included within the plurality of business entities;

generate a plurality of predicted corporate liquidity values for the business entity not included within the plurality of business entities, wherein the plurality of predicted corporate liquidity values is generated by causing each of the plurality of chosen models to generate a respective predicted corporate liquidity value based on the production data; and output a user interface that presents, within a single view, a chart illustrating a current corporate liquidity level for the business entity, and illustrating, for each of the different machine learning algorithm types, a respective predicted corporate liquidity value and a range of predicted values that is illustrated in the chart through a scatter plot of predicted values, wherein the range provides information about expected prediction error for each of the predicted corporate liquidity values, and wherein the chart further includes information enabling comparison of the predicted corporate liquidity values to traditional methods of predicting corporate liquidity.

14. The computer-readable storage medium of claim 13, further comprising instructions that, when executed, configure the processing circuitry to:

generate a plurality of candidate predictions, each generated by a different one of the plurality of candidate models, and each based on the plurality of input metrics included in the test subset;

evaluate, based on the candidate predictions, a predictive skill of each of the plurality of candidate models to identify a highest skill candidate model; and designate the highest skill candidate model as the chosen model.

* * * * *